(12) United States Patent
Barz

(10) Patent No.: US 6,932,421 B2
(45) Date of Patent: Aug. 23, 2005

(54) STRUCTURAL REINFORCEMENT MEMBER AND METHOD OF USE THEREFOR

(75) Inventor: William J. Barz, St. Clair, MI (US)

(73) Assignee: L & L Products, Inc., Romeo, MI (US)

( * ) Notice: Subject to any disclaimer, the term of this patent is extended or adjusted under 35 U.S.C. 154(b) by 0 days.

(21) Appl. No.: 10/959,693

(22) Filed: Oct. 6, 2004

(65) Prior Publication Data

US 2005/0040671 A1 Feb. 24, 2005

Related U.S. Application Data

(63) Continuation of application No. 10/646,439, filed on Aug. 21, 2003, now Pat. No. 6,883,858.
(60) Provisional application No. 60/409,625, filed on Sep. 10, 2002.

(51) Int. Cl.$^7$ .................................................. B60J 7/00
(52) U.S. Cl. ............. 296/187.02; 296/204; 296/203.03
(58) Field of Search ............................ 296/187.02, 30, 296/203.01, 146.6, 203.03, 205, 191, 198, 204, 187.03, 187.12; 52/232, 309.17, 731.6, 745.19, 735.1, 309.12; 264/257, 258; 403/171; 293/136; 156/349; 428/122

(56) References Cited

U.S. PATENT DOCUMENTS

| 3,868,796 | A |   | 3/1975 | Bush |
| 3,888,502 | A |   | 6/1975 | Felzer et al. |
| 4,463,870 | A |   | 8/1984 | Coburn, Jr. et al. |
| 4,494,349 | A | * | 1/1985 | Clements ................. 52/309.12 |
| 4,598,008 | A |   | 7/1986 | Vogt et al. |
| 4,610,836 | A |   | 9/1986 | Wycech |
| 4,751,249 | A |   | 6/1988 | Wycech |
| 4,769,391 | A |   | 9/1988 | Wycech |
| 4,769,951 | A |   | 9/1988 | Kaaden |
| 4,813,690 | A |   | 3/1989 | Coburn, Jr. |
| 4,822,011 | A | * | 4/1989 | Goldbach et al. ........... 293/136 |
| 4,836,516 | A |   | 6/1989 | Wycech |
| 4,853,270 | A |   | 8/1989 | Wycech |
| 4,861,097 | A |   | 8/1989 | Wycech |
| 4,867,271 | A |   | 9/1989 | Tschudin-Mahrer |
| 4,901,500 | A |   | 2/1990 | Wycech |

(Continued)

FOREIGN PATENT DOCUMENTS

| CA | 913319 | 10/1972 |
| DE | 197 03 429 A1 | 8/1998 |
| DE | 198 12 288 C1 | 5/1999 |
| DE | 198 56 255 C1 | 1/2000 |
| DE | 198 58 903 A1 | 6/2000 |
| EP | 0 679 501 A1 | 11/1995 |
| EP | 0 611 778 B1 | 9/1997 |
| EP | 0 891 918 A1 | 1/1999 |
| EP | 0 893 331 A1 | 1/1999 |
| EP | 0 893 332 A1 | 1/1999 |
| EP | 1 006 022 A2 | 6/2000 |
| EP | 1 084 816 A2 | 3/2001 |
| EP | 1 122 156 A2 | 8/2001 |

(Continued)

Primary Examiner—Kiran B. Patel
(74) Attorney, Agent, or Firm—Dobrusin & Thennisch PC

(57) ABSTRACT

There is disclosed a reinforcement member with a carrier member and a reinforcement material disposed on the carrier member. The carrier member includes one or more first body members disposed at angles relative to one or more second body members. The carrier member also preferably includes connector members interconnecting the body members. The body members of the carrier are preferably arranged in a zig-zag configuration, which can collapse in an accordion-like manner.

10 Claims, 4 Drawing Sheets

U.S. PATENT DOCUMENTS

| | | |
|---|---|---|
| 4,922,596 A | 5/1990 | Wycech |
| 4,923,902 A | 5/1990 | Wycech |
| 4,978,562 A | 12/1990 | Wycech |
| 5,124,186 A | 6/1992 | Wycech |
| 5,266,133 A | 11/1993 | Hanley et al. |
| 5,288,538 A | 2/1994 | Spears |
| 5,344,208 A | 9/1994 | Bien et al. |
| 5,358,397 A | 10/1994 | Ligon et al. |
| 5,506,025 A | 4/1996 | Otto et al. |
| 5,575,526 A | 11/1996 | Wycech |
| 5,631,027 A | 5/1997 | Takabatake |
| 5,660,116 A | 8/1997 | Dannawi et al. |
| 5,725,272 A | 3/1998 | Jones |
| 5,755,486 A * | 5/1998 | Wycech ................ 296/187.02 |
| 5,766,719 A | 6/1998 | Rimkus |
| 5,806,915 A | 9/1998 | Takabatake |
| 5,819,408 A | 10/1998 | Catlin |
| 5,851,626 A | 12/1998 | McCorry et al. |
| 5,884,960 A | 3/1999 | Wycech |
| 5,888,600 A | 3/1999 | Wycech |
| 5,892,187 A | 4/1999 | Patrick |
| 5,932,680 A | 8/1999 | Heider |
| 5,985,435 A | 11/1999 | Czaplicki et al. |
| 5,992,923 A | 11/1999 | Wycech |
| 6,003,274 A | 12/1999 | Wycech |
| 6,006,484 A | 12/1999 | Geissbuhler |
| 6,033,300 A | 3/2000 | Schneider |
| 6,059,342 A | 5/2000 | Kawai et al. |
| 6,068,424 A | 5/2000 | Wycech |
| 6,079,180 A | 6/2000 | Wycech |
| 6,092,864 A * | 7/2000 | Wycech et al. ......... 296/187.02 |
| 6,096,403 A | 8/2000 | Wycech et al. |
| 6,099,948 A | 8/2000 | Paver, Jr. |
| 6,103,341 A | 8/2000 | Barz et al. |
| 6,131,897 A | 10/2000 | Barz et al. |
| 6,135,542 A * | 10/2000 | Emmelmann et al. . 296/187.02 |
| 6,149,227 A | 11/2000 | Wycech |
| 6,150,428 A | 11/2000 | Hanley, IV et al. |
| 6,165,588 A | 12/2000 | Wycech |
| 6,168,226 B1 * | 1/2001 | Wycech ................ 296/187.02 |
| 6,189,953 B1 * | 2/2001 | Wycech ................ 296/187.02 |
| 6,196,621 B1 | 3/2001 | VanAssche |
| 6,199,940 B1 | 3/2001 | Hopton et al. |
| 6,207,244 B1 | 3/2001 | Hesch |
| 6,233,826 B1 | 5/2001 | Wycech |
| 6,237,304 B1 | 5/2001 | Wycech |
| 6,247,287 B1 | 6/2001 | Takabatake |
| 6,253,352 B1 * | 6/2001 | Hanriat et al. ................. 716/4 |
| 6,253,524 B1 | 7/2001 | Hopton et al. |
| 6,263,635 B1 | 7/2001 | Czaplicki |
| 6,270,600 B1 | 8/2001 | Wycech |
| 6,272,809 B1 | 8/2001 | Wycech |
| 6,276,105 B1 | 8/2001 | Wycech |
| 6,281,260 B1 | 8/2001 | Hanley, IV et al. |
| 6,287,666 B1 | 9/2001 | Wycech |
| 6,296,298 B1 | 10/2001 | Barz |
| 6,305,136 B1 | 10/2001 | Hopton et al. |
| 6,311,452 B1 | 11/2001 | Barz et al. |
| 6,315,938 B1 | 11/2001 | Jandali |
| 6,319,964 B1 | 11/2001 | Blank et al. |
| 6,321,793 B1 | 11/2001 | Czaplicki et al. |
| 6,332,731 B1 | 12/2001 | Wycech |
| 6,341,467 B1 * | 1/2002 | Wycech ...................... 296/204 |
| 6,357,819 B1 | 3/2002 | Yoshino |
| 6,358,584 B1 | 3/2002 | Czaplicki |
| 6,368,438 B1 | 4/2002 | Chang et al. |
| 6,372,334 B1 | 4/2002 | Wycech |
| 6,378,933 B1 * | 4/2002 | Schoen et al. ......... 296/187.02 |
| D457,120 S | 5/2002 | Broccardo et al. |
| 6,382,635 B1 | 5/2002 | Fitzgerald |
| 6,383,610 B1 | 5/2002 | Barz et al. |
| 6,389,775 B1 | 5/2002 | Steiner et al. |
| 6,406,078 B1 | 6/2002 | Wycech |
| 6,413,611 B1 | 7/2002 | Roberts et al. |
| 6,419,305 B1 * | 7/2002 | Larsen ................. 296/187.02 |
| 6,422,575 B1 | 7/2002 | Czaplicki et al. |
| 6,435,601 B2 | 8/2002 | Takahara |
| H2047 H | 9/2002 | Harrison et al. |
| 6,455,144 B1 * | 9/2002 | Wycech ...................... 296/204 |
| 6,455,146 B1 | 9/2002 | Fitzgerald |
| 6,467,834 B1 * | 10/2002 | Barz et al. ............. 296/187.02 |
| 6,471,285 B1 * | 10/2002 | Czaplicki et al. ...... 296/187.02 |
| 6,474,722 B2 | 11/2002 | Barz |
| 6,474,723 B2 * | 11/2002 | Czaplicki et al. ...... 296/187.02 |
| 6,475,577 B1 | 11/2002 | Hopton et al. |
| 6,478,367 B2 | 11/2002 | Ishikawa |
| 6,482,486 B1 | 11/2002 | Czaplicki et al. |
| 6,482,496 B1 | 11/2002 | Wycech |
| 6,491,336 B1 | 12/2002 | Beckmann et al. |
| 6,502,821 B2 | 1/2003 | Schneider |
| 6,519,854 B2 | 2/2003 | Blank |
| 6,523,857 B1 | 2/2003 | Hopton et al. |
| 6,523,884 B2 * | 2/2003 | Czaplicki et al. ...... 296/187.03 |
| 6,546,693 B2 * | 4/2003 | Wycech ................. 296/187.12 |
| 6,550,847 B2 * | 4/2003 | Honda et al. ................ 296/205 |
| 6,561,571 B1 | 5/2003 | Brennecke |
| 6,573,309 B1 | 6/2003 | Reitenbach et al. |
| 6,575,526 B2 | 6/2003 | Czaplicki et al. |
| 6,585,202 B2 | 7/2003 | Broccardo et al. |
| 6,588,557 B2 | 7/2003 | Williams et al. |
| 6,607,238 B2 | 8/2003 | Barz |
| 6,619,727 B1 | 9/2003 | Barz et al. |
| 6,634,698 B2 | 10/2003 | Kleino |
| 6,641,208 B2 | 11/2003 | Czaplicki et al. |
| 6,668,457 B1 | 12/2003 | Czaplicki |
| 6,679,540 B1 | 1/2004 | Graber et al. |
| 6,691,468 B2 | 2/2004 | Helferty |
| 6,692,347 B1 | 2/2004 | Schneider |
| 6,708,979 B2 | 3/2004 | Stratman et al. |
| 6,729,425 B2 * | 5/2004 | Schneider et al. ...... 296/187.02 |
| 6,733,040 B1 * | 5/2004 | Simboli ................. 296/187.02 |
| 6,748,667 B2 | 6/2004 | Sevastian |
| 6,777,049 B2 | 8/2004 | Sheldon et al. |
| 6,786,533 B2 | 9/2004 | Bock et al. |
| 6,793,274 B2 | 9/2004 | Riley et al. |
| 6,811,864 B2 | 11/2004 | Czaplicki et al. |
| 6,820,923 B1 | 11/2004 | Bock |
| 2001/0020794 A1 | 9/2001 | Ishikawa |
| 2001/0042353 A1 | 11/2001 | Honda et al. |
| 2002/0033618 A1 * | 3/2002 | Kwon ................... 296/203.03 |
| 2002/0053179 A1 | 5/2002 | Wycech |
| 2002/0074827 A1 | 6/2002 | Fitzgerald et al. |
| 2002/0160130 A1 | 10/2002 | Sheldon et al. |
| 2002/0174954 A1 * | 11/2002 | Busseuil et al. ............. 156/349 |
| 2003/0001469 A1 | 1/2003 | Hankins et al. |
| 2003/0014409 A1 | 1/2003 | Kassa et al. |
| 2003/0039792 A1 | 2/2003 | Hable et al. |
| 2003/0042056 A1 | 3/2003 | Schneider et al. |
| 2003/0050352 A1 | 3/2003 | Guenther et al. |
| 2003/0057737 A1 | 3/2003 | Bock et al. |
| 2003/0062739 A1 | 4/2003 | Bock |
| 2003/0069335 A1 | 4/2003 | Czaplicki et al. |
| 2003/0090129 A1 | 5/2003 | Riley et al. |
| 2003/0140671 A1 | 7/2003 | Lande et al. |
| 2003/0176128 A1 | 9/2003 | Czaplicki et al. |
| 2003/0183317 A1 | 10/2003 | Czaplicki et al. |
| 2003/0184121 A1 | 10/2003 | Czaplicki et al. |
| 2003/0186049 A1 | 10/2003 | Czaplicki et al. |
| 2003/0201572 A1 | 10/2003 | Coon et al. |
| 2003/0218019 A1 | 11/2003 | Le Gall et al. |
| 2003/0235675 A1 * | 12/2003 | Wycech ...................... 428/122 |

| | | | |
|---|---|---|---|
| 2004/0011282 A1 | 1/2004 | Myers et al. | |
| 2004/0018341 A1 | 1/2004 | Richardson et al. | |
| 2004/0031164 A1 | 2/2004 | Sevastian | |
| 2004/0033344 A1 | 2/2004 | Czaplicki et al. | |
| 2004/0034982 A1 | 2/2004 | Wieber et al. | |
| 2004/0074150 A1 | 4/2004 | Wycech | |
| 2004/0079478 A1 | 4/2004 | Merz | |
| 2004/0130185 A1 | 7/2004 | Hasler et al. | |
| 2004/0135058 A1 | 7/2004 | Wycech | |
| 2004/0140658 A1 | 7/2004 | Kellas | |
| 2004/0150249 A1 | 8/2004 | Gehringhoff et al. | |
| 2004/0201253 A1 | 10/2004 | Kitagawa et al. | |

FOREIGN PATENT DOCUMENTS

| | | |
|---|---|---|
| EP | 1 149 679 A2 | 10/2001 |
| EP | 0 893 332 B1 | 3/2002 |
| EP | 1 362 683 A2 | 11/2003 |
| EP | 1 362 769 A1 | 11/2003 |
| EP | 1 428 744 A1 | 6/2004 |
| EP | 1 440 867 A1 | 7/2004 |
| EP | 1 475 295 A2 | 11/2004 |
| FR | 2 749 263 | 12/1997 |
| GB | 2 083 162 A | 3/1982 |
| GB | 2 375 328 A | 11/2002 |
| JP | 10-45031 | 2/1998 |
| JP | 10-53156 | 2/1998 |
| JP | 2000-52444 | 2/2000 |
| JP | 2001-62833 | 3/2001 |
| JP | 2001-88739 | 4/2001 |
| JP | 02001191949 A | 7/2001 |
| JP | 2002-199362 | 7/2001 |
| JP | 2002-362412 | 12/2002 |
| WO | WO 95/32110 | 11/1995 |
| WO | WO 97/02967 | 1/1997 |
| WO | WO 97/43501 | 11/1997 |
| WO | WO 98/50221 | 11/1998 |
| WO | WO 99/08854 | 2/1999 |
| WO | WO 99/28575 | 6/1999 |
| WO | WO 99/48746 | 9/1999 |
| WO | WO 99/50057 | 10/1999 |
| WO | WO 00/13958 | 3/2000 |
| WO | WO 00/27920 | 5/2000 |
| WO | WO 00/37302 | 6/2000 |
| WO | WO 00/40815 | 7/2000 |
| WO | WO 00/43254 | 7/2000 |
| WO | WO 00/46461 | 8/2000 |
| WO | WO 00/55444 | 9/2000 |
| WO | WO 01/24989 A1 | 4/2001 |
| WO | WO 01/54936 A1 | 8/2001 |
| WO | WO 01/71225 A1 | 9/2001 |
| WO | WO 01/83206 A1 | 11/2001 |
| WO | WO 01/88033 A1 | 11/2001 |
| WO | WO 03/042024 A1 | 5/2003 |
| WO | WO 03/051676 A1 | 6/2003 |

* cited by examiner

STRUCTURAL REINFORCEMENT MEMBER AND METHOD OF USE THEREFOR

CLAIM OF BENEFIT OF FILING DATE

This application is a continuation of application Ser. No. 10/646,439 filed on Aug. 21, 2003, now U.S.P at. No. 6,883,858, which claims the benefit of U.S. Provisional Application No. 60/409,625,filed on Sep. 10, 2002.

FIELD OF THE INVENTION

The present invention relates generally to a structural reinforcement member and its use in a reinforced structural system.

BACKGROUND OF THE INVENTION

For many years the transportation industry has been concerned with designing structural reinforcement members that do not add significantly to the weight of a vehicle. For example, U.S. Pat. Nos. 5,755,486; 4,901,500; and 4,751,249 describe prior art reinforcing devices. The present invention therefore seeks to provide an improved structural reinforcement member and a method for its use in a reinforced structural system.

SUMMARY OF THE INVENTION

The present invention is directed to a structural reinforcement member adapted for placement in a cavity or elsewhere of an automotive vehicle for forming a reinforced structural system. Generally speaking, the assembly may utilize technology and processes such as those disclosed in U.S. Pat. Nos. 4,922,596, 4,978,562, 5,124,186, and 5,884,960 and commonly owned, co-pending U.S. application Ser. No. 09/502,686 filed Feb. 11, 2000 and U.S. application Ser. No. 09/524,961 filed Mar. 14, 2000, all of which are expressly incorporated by reference. The structural reinforcement member typically includes a carrier member, which employs a first body member disposed at an angle relative to a second body member. The structural carrier member also typically employs at least one connector member that interconnects the first body member with the second body member. Moreover, the structural reinforcement member typically includes a reinforcement material disposed on the carrier member. Preferably, the reinforcement material is an energy absorbing medium, and a heat activated bonding material. In a particular preferred embodiment, the carrier member or at least portions thereof could be formed of injection molded nylon, injection molded polymer, or molded metal (such as aluminum, magnesium, steel and titanium, an alloy derived from the metals, and even a metallic foam). The reinforcement material may be a foamable or expandable material, which could comprise an epoxy-based resin, such as L5204, L5206, L5207, L5208 or L5209 structural foam commercially available from L & L Products of Romeo, Mich. Additional foamable or expandable materials that could be utilized in the present invention include other materials which are suitable as bonding mediums and which may be heat activated foams which activate and expand to fill a desired cavity or occupy a desired space or function when exposed to temperatures typically encountered in automotive e-coat and other paint operations. In addition, it is contemplated that the carrier member could comprise a nylon or other polymeric material as set forth in commonly owned U.S. Pat. No. 6,103,341, expressly incorporated by reference herein.

Though other heat-activated materials are possible, a preferred heat activated material is an expandable or flowable polymeric formulation, and preferably one that is activated to foam, flow or otherwise change states when exposed to the heating operation of a typical automotive assembly painting operation. For example, without limitation, in one embodiment, the polymeric foam is based on ethylene copolymer or terpolymer that may possess an alpha-olefin. As a copolymer or terpolymer, the polymer is composed of two or three different monomers, i.e., small molecules with high chemical reactivity that are capable of linking up with similar molecules. Examples of particularly preferred polymers include ethylene vinyl acetate, EPDM, or a mixture thereof. Without limitation, other examples of preferred foam formulation that are commercially available include polymer-based material commercially available from L&L Products, inc. of Romeo, Mich., under the designations as L-2105, L-2100, L-7005 or L-2018, L-7101, L-7102, L-2411, L-2412, L-4141, etc. and may comprise either open or closed cell polymeric base material.

A number of other suitable materials are known in the art and may also be used for vibration reduction. One such foam preferably includes a polymeric base material, such as an ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally activated material, the vibration reducing foam is usually initially processed as a flowable thermoplastic material before curing. It will cross-link upon curing, which makes the material resistant of further flow or change of final shape.

It is contemplated that the reinforcement material could be delivered and placed into contact with a member (e.g. a carrier member), through a variety of delivery systems which include, but are not limited to, a mechanical snap fit assembly, extrusion techniques commonly known in the art as well as a mini-applicator technique as in accordance with the teachings of commonly owned U.S. Pat. No. 5,358,397 ("Apparatus For Extruding Flowable Materials"), hereby expressly incorporated by reference. In this non-limiting embodiment, the material or medium is at least partially coated with an active polymer having damping characteristics or other heat activated polymer, (e.g., a formable hot melt adhesive based polymer or an expandable structural foam, examples of which include olefinic polymers, vinyl polymers, thermoplastic rubber-containing polymers, epoxies, urethanes or the like) wherein the foamable or expandable material can be snap-fit onto the chosen surface or substrate; placed into beads or pellets for placement along the chosen substrate or member by means of extrusion; placed along the substrate through the use of baffle technology; a die-cast application according to teachings that are well known in the art; pumpable application systems which could include the use of a baffle and bladder system; and sprayable applications.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENT

Figure 1:
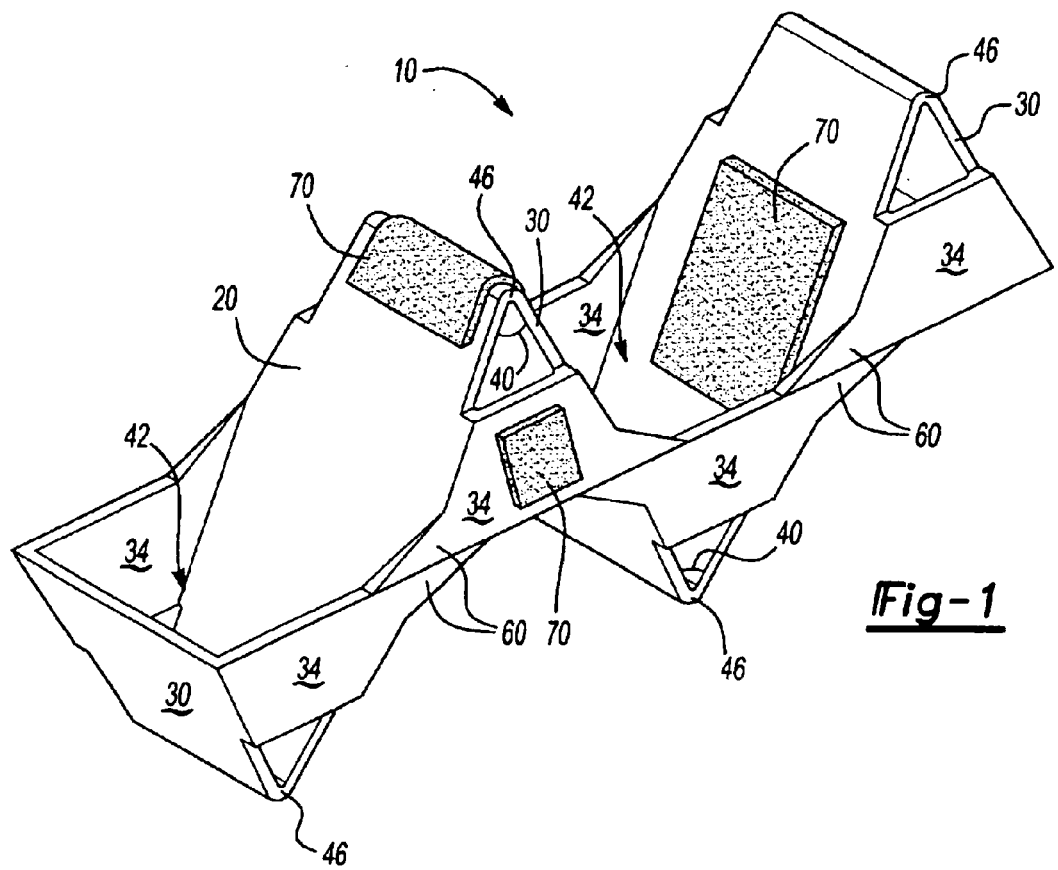
FIG. 1 is a perspective view of a structural reinforcement member according to a preferred aspect of the present invention.
Figure 2:
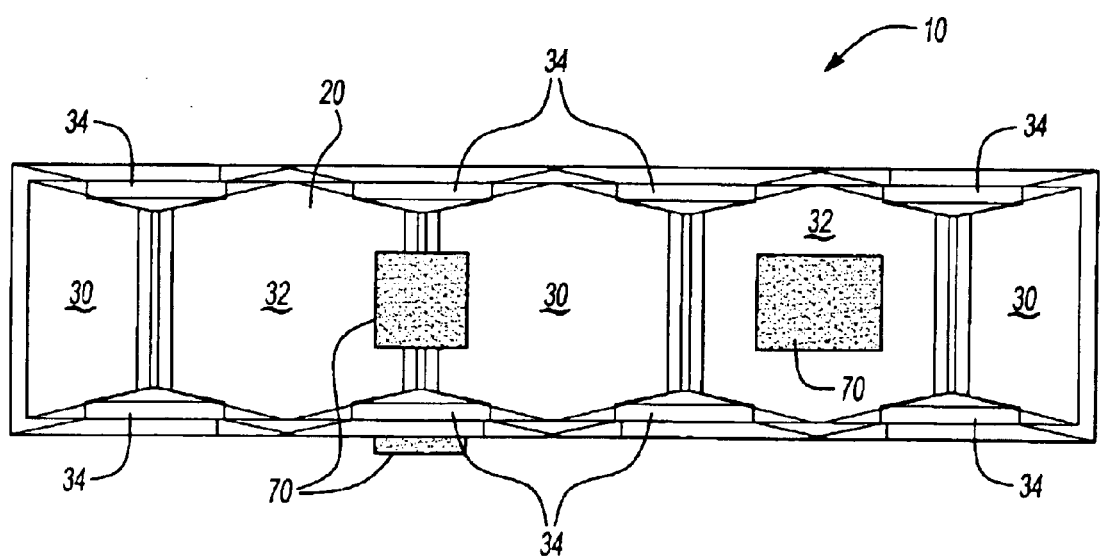
FIG. 2 is a top view of the structural reinforcement member of FIG. 1.
Figure 3:
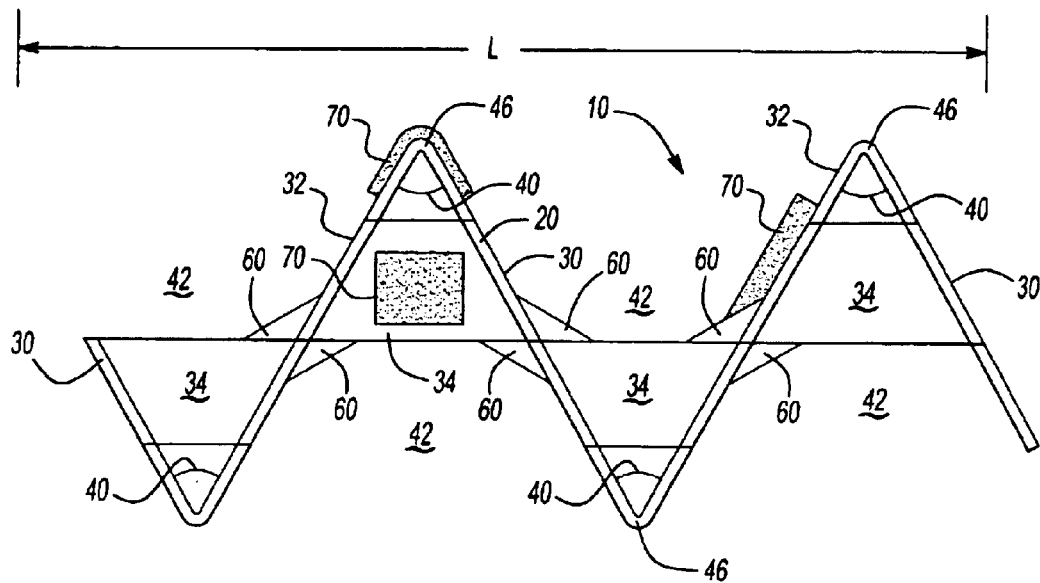
FIG. 3 is a side view of the structural reinforcement member of FIG. 1.

The present invention is predicated upon a structural reinforcement member and its use in forming a structural reinforcement system within an article of manufacture. The structural reinforcement member has been found to be particularly useful for reinforcing portions of automotive vehicles, however, it is contemplated that the member may be employed in a variety of articles of manufacture such as buildings, furniture, watercraft or the like.

Typically, a structural reinforcement member according to the present invention will include a carrier member with a reinforcement material disposed thereon. It is also contemplated, however, that the carrier member may be utilized without the reinforcement material. The carrier member is generally composed of at least one first body member and at least one second body member, but preferably, the carrier member includes a plurality (e.g., 2, 3, 4, 5 or more) of first body members and a plurality of second body members. In a preferred configuration, each of the first body members are disposed at an angle relative to respective second body members. The carrier member also includes at least one connector member that interconnects the at least one first body member to the at least one second body member, but preferably includes a plurality of connector members each attached to one of the plurality of first body members and one of the plurality of second body members.

The first body members, the second body members and the connector members may be provided in a variety of shapes and configurations. For example, and without limitation, the members may be cylindrical, rectangular, contoured, angled, bent, curved, planar, non-planar, flat or the like. The first body members, the second body members and the connector members may be integrally formed of a singular material or they may be formed as separate components that are fastened together to form an integral carrier member. Preferably, the first body members and the second body members are attached to each other at ends of the first and second body members while the connector members bridge a space located substantially between the first and second body members, although neither is necessarily required. As used herein, the term "bridge" includes situations where the connector members extends through the space between the body members, adjacent the space between the body members or a combination thereof or the like.

Advantageously, according to one preferred embodiment of the invention, the first body members and the second body members collapse upon each other in an accordion-like or spring-like manner upon an impact from a member or entity. At substantially the same time, the connector members are flexed preferably to fracture as the first body members collapse upon the second body members. According to this particular embodiment, the connector members assist in controlling the amount of energy absorbed and/or transferred by the reinforcement member upon the occurrence of the impact as will be described further below.

FIGS. 1–4 and 6 illustrate an example of a structural reinforcement member 10, which may be configured for placement within a cavity 12 of an automotive vehicle (not shown) for forming a reinforced structural system 14 along with one or more components of the vehicle. Preferably, the one or more components of the vehicle at least partially define the cavity 12. As will be appreciated, the member 10 may be suited for placement in a variety of cavities for reinforcing a variety of components of the automotive vehicle.

The reinforcement member 10 includes a carrier member 20 comprised of a plurality of first body members shown as first body walls 30, a plurality of second body members shown as second body walls 32 and a plurality of connector members shown as connector walls 34. The first body walls 30 and second body walls 32 are illustrated as substantially rectangular and each includes a first surface opposite and substantially parallel to a second surface. The carrier member 20 is preferably elongated with the first body walls 30 and the second body walls disposed along a length (L) of the reinforcement member 10. In the depicted embodiment, the first body walls 30 are disposed intermittently with the second walls 32 along the length (L) of the carrier member 20, however, alterative configurations may also be utilized.

As shown, each of the first body walls 30 is disposed at an angle 40 with respect to at least one and sometimes a pair of adjoining second body walls 32 for forming a substantially triangular open space 42 therebetween. Such a configuration may provide the carrier member 20 and particularly the body walls 30, 32 in a zig-zag type shape although not required. Preferably, the body walls 30, 32 are attached to each other at integrally formed attachment portions 46, which are shown as arcuate portions, which attach ends of the first and second body walls 30, 32 together. It is contemplated that the angles 40 at which the walls 30, 32 are disposed relative to each other may be substantially equivalent to each other or may be different.

The connector walls 34, in the preferred embodiment depicted, are shaped as truncated triangles with flanges 60 extending outwardly, but may be formed otherwise as needed or desired. The connector walls 34 are illustrated as being attached to at least one first body wall 30 and at least one second body wall 32 adjoining that first body wall 30 thereby bridging the open space 42 between the first body wall 32 and the second body wall 32. In the preferred embodiment illustrated, each first body wall 30 is connected to at least one, but possibly two, second body walls 32 by a pair of connector walls 34 and the connector walls 34 interconnect the sides of the body walls 30, 32. Also, in the preferred embodiment, the connector walls 34 may be contoured to, as shown, include or form an arc or angle 66 as shown best in FIGS. 4 and 5.

The first and second body walls 30, 32 and the connector walls 34 of the carrier member 20 are illustrated as being formed of a singular material, which may be chosen from a variety of materials such as plastics, polymers, metals, fiberglass or other such materials. In a preferred embodiment, the members 30, 32, 34 are integrally formed of a molded glass filled nylon.

In FIGS. 1–4 and 6, the reinforcement member 10 is illustrated with a reinforcement material 70 disposed upon the carrier member 20. The reinforcement material 70 may be disposed upon any portion of the carrier member 20 and, for illustrative purposes, the reinforcement material 70 has been disposed on surfaces of the first and second body walls 30, 32, the arcuate portions 46, the connector walls 34 or combinations thereof.

Preferably, the reinforcement material is a high compressive strength heat activated reinforcement material having foamable characteristics. The material may be generally dry to the touch or tacky and can be placed upon the surfaces of the members in any form of desired pattern, placement, or thickness, but is preferably a substantially uniform thickness. One exemplary expandable material is L-5204 structural foam available through L&L Products, Inc. of Romeo, Mich.

Though other heat activated materials are possible for the reinforcement material 70, a preferred heat activated material is an expandable plastic, and preferably one that is foamable. A particularly preferred material is an epoxy-based structural foam. For example, without limitation, the structural foam may be an epoxy-based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of epoxy-based structural reinforcing foams are known in the art and may also be used to produce the structural foam. A typical structural foam includes a polymeric base material, such as an epoxy resin or ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally-activated material, the structural foam is usually initially processed as a flowable thermoplastic material before curing. It will cross-link upon curing, which makes the material incapable of further flow.

An example of a preferred structural foam formulation is an epoxy-based material that is commercially available from L&L Products of Romeo, Mich., under the designations L5206, L5207, L5208, L5209, XP321 and XP721. One advantage of the preferred structural foam materials over prior art materials is that the preferred materials can be processed in several ways. The preferred materials can be processed by injection molding, extrusion compression molding or with a mini-applicator. This enables the formation and creation of part designs that exceed the capability of most prior art materials. In one preferred embodiment, the structural foam (in its uncured state) generally is dry or relatively free of tack to the touch and can easily be attached to the members through fastening means which are well known in the art.

While the preferred materials for fabricating the reinforcement material 70 have been disclosed, the reinforcement material 70 can be formed of other materials provided that the material selected is heat-activated or otherwise activated by an ambient condition (e.g. moisture, pressure, time or the like) and cures in a predictable and reliable manner under appropriate conditions for the selected application. One such material is the epoxy based resin disclosed in U.S. Pat. No. 6,131,897, the teachings of which are incorporated herein by reference, filed with the United States Patent and Trademark Office on Mar. 8, 1999 by the assignee of this application. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766,719; 5,755,486; 5,575,526; and 5,932,680, (incorporated by reference). In general, the desired characteristics of the structural foam include relatively high stiffness, high strength, high glass transition temperature (typically greater than 70 degrees Celsius), and good corrosion resistance properties. In this manner, the material does not generally interfere with the materials systems employed by automobile manufacturers.

In applications where the reinforcement material 70 is a heat activated, thermally expanding material, an important consideration involved with the selection and formulation of the material comprising the structural foam is the temperature at which a material reaction or expansion, and possibly curing, will take place. For instance, in most applications, it is undesirable for the material to be reactive at room temperature or otherwise at the ambient temperature in a production line environment. More typically, the structural foam becomes reactive at higher processing temperatures, such as those encountered in an automobile assembly plant, when the foam is processed along with the automobile components at elevated temperatures or at higher applied energy levels, e.g., during painting preparation steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. If needed, blowing agent activators can be incorporated into the composition to cause expansion at different temperatures outside the above ranges.

Generally, suitable expandable foams have a range of expansion ranging from approximately 0 to over 1000 percent. The level of expansion of the structural foam 70 may be increased to as high as 1500 percent or more. Typically, strength is obtained from products that possess low expansion.

Some other possible materials include, but are not limited to, polyolefin materials, copolymers and terpolymers with at least one monomer type an alpha-olefin, phenol/formaldehyde materials, phenoxy materials, and polyurethane. See also, U.S. Pat. Nos. 5,266,133; 5,766,719; 5,755,486; 5,575,526; 5,932,680; and WO 00/27920 (PCT/US 99/24795) (all of which are expressly incorporated by reference). In general, the desired characteristics of the resulting material include relatively low glass transition point, and good corrosion resistance properties. In this manner, the material does not generally interfere with the materials systems employed by automobile manufacturers. Moreover, it will withstand the processing conditions typically encountered in the manufacture of a vehicle, such as the e-coat priming, cleaning and degreasing and other coating processes, as well as the painting operations encountered in final vehicle assembly.

In another embodiment, the reinforcement material 60 is provided in an encapsulated or partially encapsulated form, which may comprise a pellet, which includes an expandable foamable material, encapsulated or partially encapsulated in an adhesive shell. An example of one such system is disclosed in commonly owned, co-pending U.S. application Ser. No. 09/524,298 ("Expandable Pre-Formed Plug"), hereby incorporated by reference.

In addition, as discussed previously, preformed patterns may also be employed such as those made by extruding a sheet (having a flat or contoured surface) and then die cutting it according to a predetermined configuration in accordance with the chosen structure, member or surface and applying it thereto.

The skilled artisan will appreciate that the system may be employed in combination with or as a component of a conventional sound blocking baffle, or a vehicle structural reinforcement system, such as is disclosed in commonly owned co-pending U.S. application Ser. Nos. 09/524,961 or 09/502,686 (hereby incorporated by reference).

During formation of the reinforced structural system 14, the reinforcing structural member 10 is typically placed within a cavity of an automotive vehicle for forming the reinforced structural system 14 with one or more components 80 of the automotive vehicle. As discussed, several components within an automotive vehicle may form cavities suitable for receiving a reinforcing structural assembly of the present invention.

Figure 6:
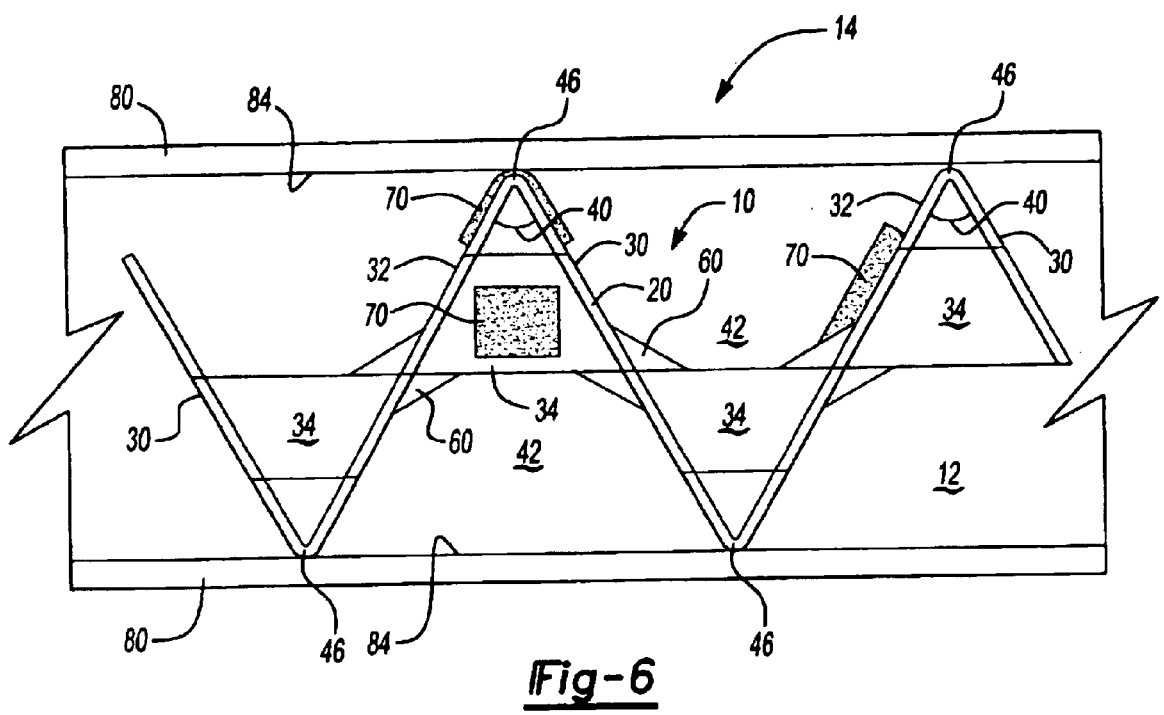
FIG. 6 is a partially cut away side view of a reinforced structural system according to a preferred aspect of the present invention.

In the exemplary embodiment shown in FIG. 6, the member 10 is placed within a cavity 12 defined by walls 84 of the one or more components 80. As previously discussed, the member 10 may be without reinforcement material and may act on its own as a reinforcement for the components 80 of the vehicle. Alternatively, however, for embodiments that include the reinforcement material, the reinforcement material 70 is activated (e.g., expanded using heat experienced during an e-coat process or other painting operation typically encountered in the production of automotive vehicles), such that the reinforcement material 70, expands, contacts and adheres to the walls 84 or surfaces of the components 80 adjacent the materials 70.

Once the reinforcement material 70 is substantially fully expanded and cured, the reinforcement member 10 reinforces the components 80 and/or other members (e.g., frame members, body members or panels, pillars or the like) of the vehicle thereby forming reinforced system 14. Upon sustaining an impact, the reinforcement member 10 provides strength to the components 80 of the system 14 thereby assisting the system 14 in resisting the impact.

Advantageously, the reinforcement member 10 provides strength and resistance to deformation caused by such impacts in a controlled manner. Particularly, and with additional reference to FIG. 5, an impact that is experienced at least partially in the direction of elongation of the structural reinforcement member 10 causes the first and second body members 30, 32 to move toward each other. As the body member 30, 32 move toward each other, the connector members 34 are progressively, intermittently or consecutively fractured. In this manner, the reinforcement member 10 only substantially provides resistance or strength against an impact up to the amount of force required to fracture the connector members 34. As consecutive or intermittent of the connector members 34 fracture, however, that amount of force is repeatedly applied against the impact. Thus, the reinforcement member 10 continues to absorb amounts of force or energy from the impact repeatedly, thereby allowing the reinforcement member 10 provide a less jarring effect due to its impact resistance. Thus, the reinforcement provides a greater amount of energy dissipation while transferring a smaller amount of load during an impact.

Figure 4:
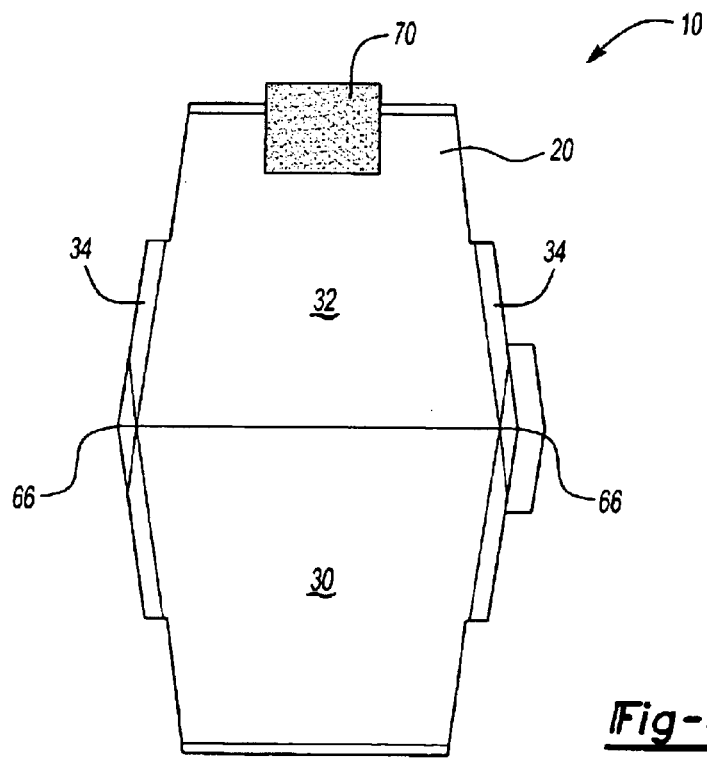
FIG. 4 is a front view of the structural reinforcement member of FIG. 1.
Figure 5:
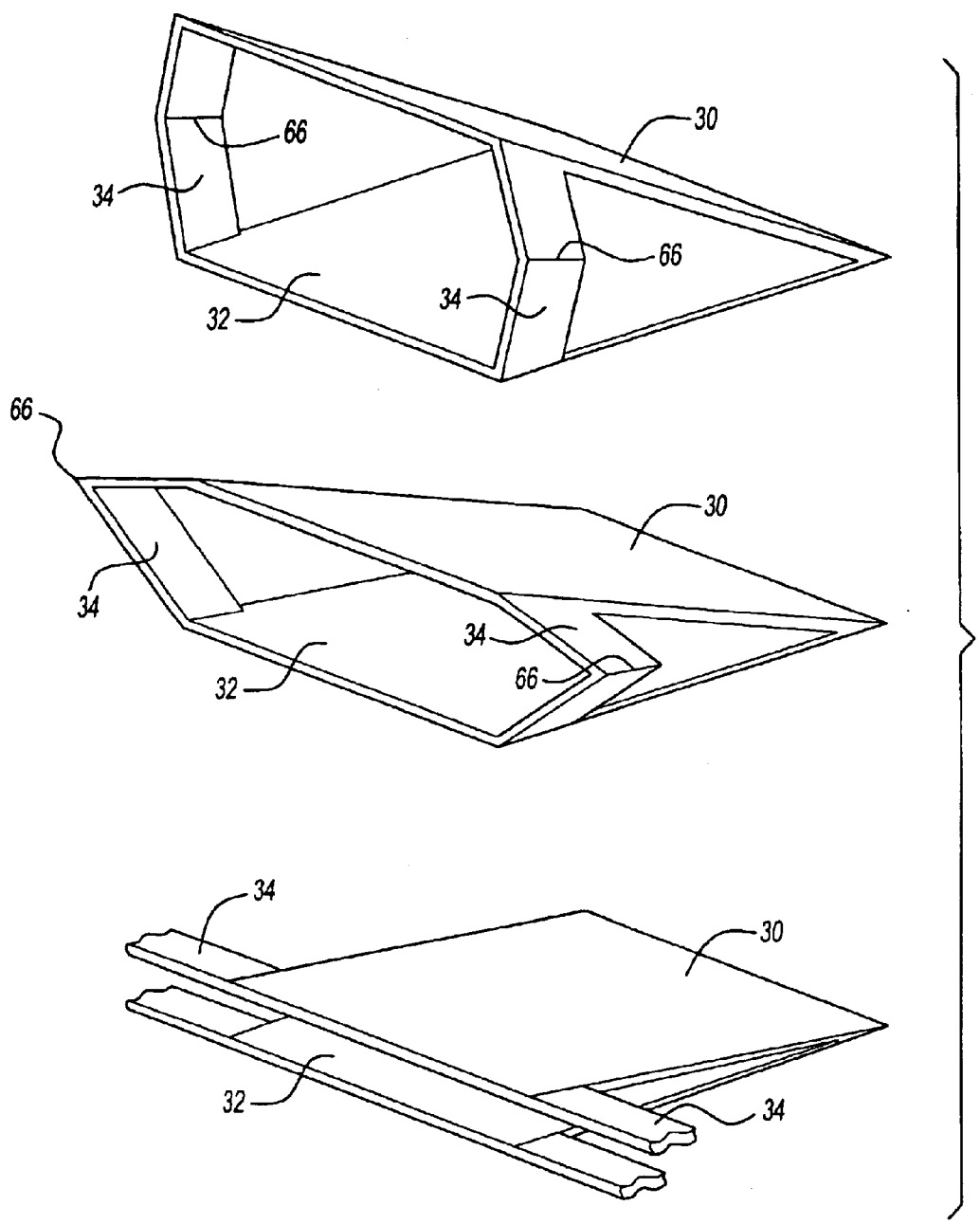
FIG. 5 is a perspective view of the operation of a portion of a structural reinforcement member according to a preferred aspect of the present invention.

In the preferred embodiment illustrated particularly in FIGS. 4 and 5, the connector members 34 are arced, angled or bowed out in the preferred direction of fracture for the connector members 34 thereby offering additional control to the reinforcement member 10. As shown, the connector walls 34 are illustrated as fracturing outwardly away from the sides of the member 10. Alternatively, however, the connector walls may fracture inwardly, downwardly, upwardly, a combination thereof or the like.

For additional absorption of impact energy, reinforcement material 70 may be located to expand within the open spaces 42 between the body walls 30, 32. Such reinforcement material 70 may limit or slow movement of the body walls 30, 32 toward each other upon the occurrence of an impact. In turn, such reinforcement material assists in absorbing greater energy from the impact.

Figure 7:
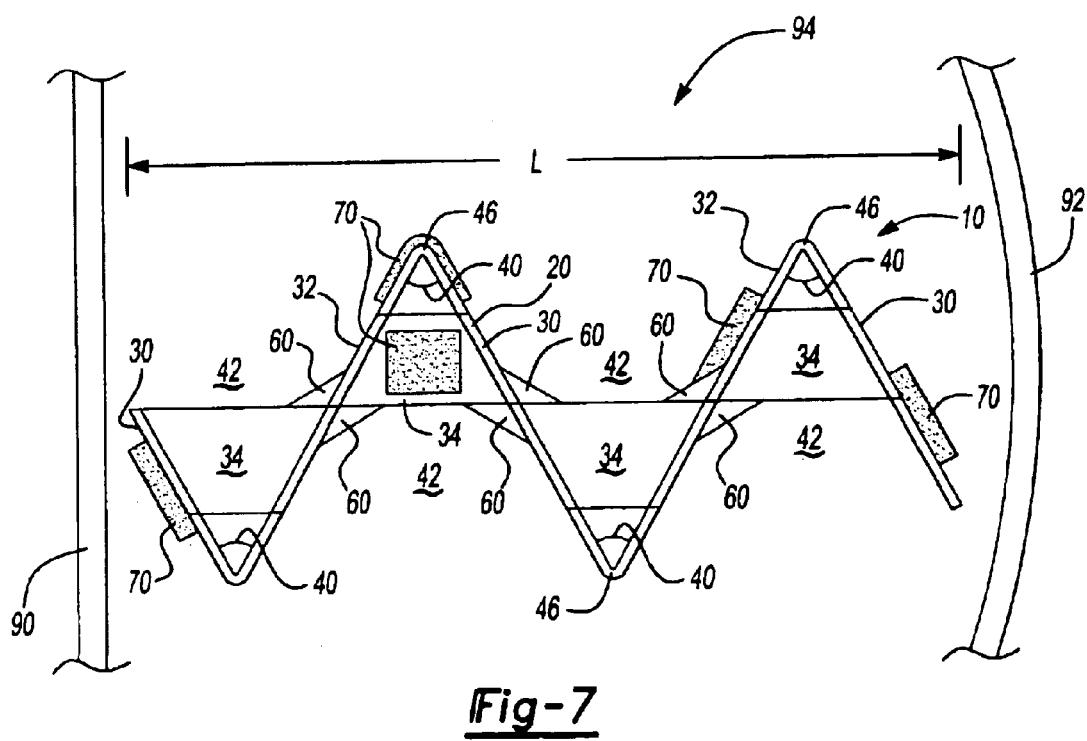
FIG. 7 is a partially cut away side view of a reinforced structural system according to another preferred aspect of the present invention.

In an alternative preferred embodiment, and referring to FIG. 7, the reinforcement member 10 is placed between a body side inner panel 90 and a body side outer panel 92 of a door or other portion of the vehicle. As shown the reinforcement member 10 is arranged such that the body walls 30, 32 substantially oppose the body panels 90, 92 of the vehicle while the connector members 34 extend substantially perpendicular to the panels 90, 92. Preferably, the length (L) of the reinforcement member 10 extends from one of the panels 90, 92 to the other. It is also preferable for the reinforcement material 70 to be positioned at the ends of the length (L) of the reinforcement member 10. It may also be desirable for the reinforcement material to be positioned only at the ends of the member 10, although the reinforcement material may be positioned at any of the other locations discussed herein.

Upon installation, the reinforcement material 70 at the ends of the length (L) of the reinforcement member 10 may expand and adhere to the body panels 90, 92 thereby forming a reinforced structural system 94 with the body panels 90, 92. In operation, the member 10 may be deformed substantially as previously described.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A reinforced structural system of an automotive vehicle, comprising:
   a structure of an automotive vehicle wherein the structure has a plurality of walls at least partially defining a cavity and wherein the structure of the automotive vehicle is provided by a frame member, a pair of opposing panels, a pillar or a combination thereof; and
   an elongated carrier member attached to the structure of the automotive vehicle at multiple locations, the carrier member including:
   i) one or more body members extending along a length of the carrier; and
   ii) multiple consecutive connector members connected to the one or more body members and arranged along the length of the carrier member;
   wherein, upon the occurrence of an impact, the carrier member is configured to progressively collapse along its length.

2. A system as in claim 1 wherein the multiple connector members are configured to progressively flex during progressive collapse of the carrier member.

3. A system as in claim 2 wherein the one or more body members includes three or more body members arranged in a zig-zag configuration relative to each other and wherein, upon the occurrence of the impact, the three or more body members are configured to progressively collapse upon each other in an accordion manner.

4. A system as in claim 3 wherein the structure is a frame member and the carrier member extends along a length of the structure.

5. A system as in claim 4 wherein the elongated carrier member is attached to the structure with a reinforcement material disposed upon a portion of the carrier member, the portion of the carrier member being selected from the one or more body members and the multiple connector members.

6. A system as in claim 5 wherein the multiple connector members are configured to progressively fracture during progressive collapse of the carrier member.

7. A system as in claim 6 wherein the reinforcement material is an expanded foam material.

8. A system as in claim 7 wherein at least a portion of the expanded reinforcement material is located in a space defined between a first of the one or more body members and a second of the one or more body members.

9. A system as in claim 8 wherein the carrier member is formed of a singular polymeric material and wherein the one or more body members include a first body member and a second body member and at least one of the multiple connector members bridges a space between the first body member and the second body member and wherein the multiple connector members are arced, angled or bowed outwardly relative to the carrier member.

10. A system as in claim 4 wherein the carrier member assists the structure in progressively collapsing upon the occurrence of the impact.

* * * * *